US012791323B1

(12) United States Patent
Gupta et al.

(10) Patent No.: US 12,791,323 B1
(45) Date of Patent: Nov. 10, 2026

(54) ENHANCED MARINE MAPPING WITH QUANTUM GRAVIMETRY AND OPTIMIZED VESSEL NAVIGATION

(71) Applicants: QuNu Labs Private Limited, Bengaluru (IN); GDQLABS Private Limited, Pune (IN)

(72) Inventors: Sunil Kumar Gupta, Bengaluru (IN); Dilip Kumar Singh, Gurgaon (IN); Krishnan Rajesh Kumar, Bengaluru (IN); Korak Biswas, Nadia (IN); Kushal Patel, Ahmedabad (IN); Pranab Dutta, Dhemaji (IN); Shiv Sagar Maurya, Mirzapur (IN)

(73) Assignees: QuNu Labs Private Limited, Bengaluru (IN); GDQLABS Private Limited, Pune (IN)

( * ) Notice: Subject to any disclaimer, the term of this patent is extended or adjusted under 35 U.S.C. 154(b) by 0 days.

(21) Appl. No.: 19/259,009

(22) Filed: Jul. 3, 2025

(51) Int. Cl.
*G01C 21/20* (2006.01)
*G01C 21/16* (2006.01)
*G01V 7/06* (2006.01)

(52) U.S. Cl.
CPC ......... *G01C 21/203* (2013.01); *G01C 21/185* (2020.08); *G01V 7/06* (2013.01)

(58) Field of Classification Search
CPC ....... G01C 21/203; G01C 21/185; G01V 7/06
See application file for complete search history.

(56) References Cited

U.S. PATENT DOCUMENTS

2021/0215484 A1 7/2021 Keyes

FOREIGN PATENT DOCUMENTS

CN 112782776 A 5/2021
CN 114440875 A * 5/2022 ............. G06F 18/22
(Continued)

OTHER PUBLICATIONS https://www.nature.com/articles/s41467-018-03040-2.pdf ; Absolute marine gravimetry with matter-wave interferometry; Y. Bidel1, N. Zahzam, C. Blanchard, A. Bonnin, M. Cadoret, A. Bresson, D. Rouxel & M.F. Lequentrec-Lalancette; Nature Communications| (2018) 9:627; DOI: 10.1038/s41467-018-03040-2.
(Continued)

*Primary Examiner* — Michael V Kerrigan
(74) *Attorney, Agent, or Firm* — Jason C. Cameron

(57) ABSTRACT

A computer-implemented system and method for determining gravity map to navigate vessels based on quantum sensors, is disclosed. Initially, first data associated with velocity of vessels are determined using first accelerometer. Further, second data associated with attitude of the vessels are determined using first optical gyroscope. First gravity data collected from first quantum gravimeter is mapped with second gravity data associated with gravity and gravity gradient maps that are obtained from a data processing model in marine mapping using quantum gravity. The first gravity data and the second gravity data are processed with the first data associated with velocity of the vessels and second data associated with attitude of the vessels. At least one of: position, velocity and attitude, of the vessels to navigate the vessels based on the first gravity data being compared with second gravity data associated with gravity map of the gravity and gravity gradient.

18 Claims, 4 Drawing Sheets

(56) References Cited

FOREIGN PATENT DOCUMENTS

| | | | |
|---|---|---|---|
| CN | 110850497 | B | 6/2022 |
| WO | 2021253488 | A1 | 12/2021 |

OTHER PUBLICATIONS https://pubs.geoscienceworld.org/geophysics/article-abstract/85/3/G69/584718/A-new-method-for-underwater-dynamic-gravimetry?redirectedFrom=PDF ; A new method for underwater dynamic gravimetry based on multisensor integrated navigation; Zhiming Xiong; Juliang Cao; Kaixun Liao; Meiping Wu; Shaokun Cai; Ruihang Yu; Minghao Wang; Geophysics (2020) 85 (3): G69-G80.

* cited by examiner

ENHANCED MARINE MAPPING WITH QUANTUM GRAVIMETRY AND OPTIMIZED VESSEL NAVIGATION

FIELD OF INVENTION

Embodiments of the present disclosure relate to enhanced marine mapping, and more particularly relates to an computer-implemented system and method for determining a precise gravity map to navigate one or more vessels using one or more quantum sensors.

BACKGROUND

Global Positioning System free (GPS-free) navigation presents a valuable alternative for maritime operations, offering enhanced reliability in environments where traditional GPS signals may be disrupted or unreliable. In coastal regions, tall buildings or cliffs can obstruct GPS signals, while areas with strong electromagnetic interference may further compromise positioning accuracy. GPS-independent navigation systems provide a crucial solution, ensuring safe and efficient vessel movement.

Additionally, in polar regions where satellite coverage may be limited or unreliable due to the proximity to the poles, GPS-free navigation techniques become essential for ships navigating through ice-infested waters or conducting scientific research expeditions. Furthermore, in scenarios where GPS signals are intentionally jammed or spoofed, such as in military operations or maritime security patrols, GPS-free navigation solutions offer enhanced security and operational capabilities.

By utilizing advanced technologies like inertial navigation systems, radar, and sonar, these solutions empower maritime operators with a resilient and precise means of navigating across oceans, seas, and waterways, even in the most challenging conditions. However, the solutions still face challenges such as drifts in the inertial navigation system which are compensated using global positioning system (GPS), reduced radar effectiveness due to heavy rain, fog, and sea spray scattering or absorbing signals, and decreased sonar effectiveness with depth and distance due to absorption and scattering of sound waves. Generally, marine gravity mapping plays a vital role in overcoming this challenges by detecting subsurface geological structures, including faults, basins, and geological boundaries. By analyzing variations in gravitational forces, this marine gravity mapping technique generates a precise gravity map for maritime navigation, utilizing a map-matching technique for precise navigation. Such information are also essential for understanding geological processes, assessing natural resource potential, and advancing research in geophysics and plate tectonics.

Further, gravity mapping is a crucial tool for identifying potential hydrocarbon reservoirs, mineral deposits, and other natural resources beneath the ocean floor. By examining gravity anomalies, geoscientists can detect variations in subsurface density, which indicate the presence of oil, gas, and mineral-rich formations. This gravity mapping technique may enhance exploration efficiency by directing efforts toward high-potential areas, reducing costs and improving resource discovery in deep-sea environments.

However, marine gravity measurements face significant challenges due to continuous influence of ocean currents on gravitational acceleration. These disturbances, inherently linked to a measured gravity signal, make it difficult to obtain precise readings during surveys. Additionally, errors caused by gravimeter drift may be partially corrected through drift modeling, though this method is prone to inaccuracies, requiring careful calibration and validation to improve measurement reliability.

Hence, there is a need for an improved computer-implemented system with marine mapping technique and method for determining a precise gravity map to navigate one or more vessels using one or more quantum sensors, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for determining a gravity map to navigate one or more vessels based on one or more quantum sensors, is disclosed. This computer-implemented method comprises determining first data associated with velocity of the one or more vessels using a first accelerometer configured in the one or more vessels.

The computer-implemented method further comprises determining second data associated with attitude of the one or more vessels using a first optical gyroscope configured in the one or more vessels. The computer-implemented method further comprises obtaining first gravity data from a first quantum gravimeter along a trajectory of the one or more vessels. The computer-implemented method further comprises analyzing second gravity data associated with the gravity map of gravity and gravity gradient, along the trajectory of the one or more vessels. The gravity map is a pre-defined gravity map related to the second gravity data generated using a data processing model.

The computer-implemented method further comprises analyzing the trajectory of the one or more vessels based on the first gravity data and the second gravity data associated with the gravity map of the gravity and gravity gradient. The computer-implemented method further comprises processing the first gravity data and the second gravity data associated with the gravity map of the gravity and gravity gradient, with at least one of: the first data associated with the velocity of the one or more vessels and the second data associated with the attitude of the one or more vessels, using a navigation processor. The computer-implemented method further comprises identifying at least one of: position, velocity and attitude, of the one or more vessels to navigate the one or more vessels based on the first gravity data being compared with the second gravity data associated with the gravity map of the gravity and gravity gradient.

In an embodiment, the computer-implemented method further comprises determining, by the data processing model, the second gravity data associated with the precise gravity map of the gravity and gravity gradient through quicker method, along the trajectory of the one or more vessels, comprises: (a) analyzing, by a second quantum gravimeter, a group of atoms to determine third data associated with gravity on the one or more vessels; (b) determining, by at least one of: a second accelerometer, a second optical gyroscope, and a global positioning system (GPS), fourth data associated with at least one of: position (coordinates), acceleration, and attitude, of the one or more vessels; (c) collecting, by the data processing model, at least one of: the third data associated with the gravity on the one or more vessels from the second quantum gravimeter, and the fourth data associated with at least one of: the acceleration, position, and attitude, of the one or more vessels, from at least one of: the second accelerometer, the second optical gyroscope, and the GPS; (d) determining, by the data processing model, at least one of: gravity value and spatial gravity anomaly based on at least one of: the third data associated with the gravity on the one or more vessels collected from the second quantum gravimeter, and the fourth data associated with at least one of: the acceleration, position, and attitude, of the one or more vessels, collected from at least one of: the second accelerometer, the second optical gyroscope, and the GPS; (e) determining, by the data processing model, the gravity gradient along the trajectory of the one or more vessels based on the gravity and the spatial gravity anomaly; (f) mapping, by the data processing model, the gravity and the gravity gradient; and (g) determining, by the data processing model, the second gravity data to create the gravity map of the gravity and the gravity gradient, along the trajectory of the one or more vessels.

In another embodiment, the computer-implemented method further comprises extracting, by the data processing model, a gravitational acceleration from a total acceleration.

In yet another embodiment, determining the third data associated with the gravity along the trajectory of the one or more vessels, comprises measuring the total acceleration using the second quantum gravimeter. In an embodiment, measuring the total acceleration comprises combining random acceleration as a result of random vertical movement of the one or more vessels and an acceleration as a result of the gravity.

In yet another embodiment, at least one of: the first data associated with velocity, the second data associated with the attitude, of the one or more vessels are determined based on initial configurations of the one or more vessels. The initial configurations of the one or more vessels comprises data associated with at least one of: initial velocity values and initial attitude values, of the one or more vessels.

In yet another embodiment, time dependence on the gravity arises as a result of a motion of the one or more vessels.

In one aspect, a computer-implemented system for determining a gravity map to navigate one or more vessels based on one or more quantum sensors, is disclosed. The computer-implemented system comprises a first accelerometer in the one or more vessels configured to determine first data associated with velocity of the one or more vessels. The computer-implemented system further comprises a first optical gyroscope in the one or more vessels configured to determine second data associated with attitude of the one or more vessels.

The computer-implemented system further comprises a navigation processor configured to: (a) obtain first gravity data from an on board quantum gravimeter (i.e., a first quantum gravimeter) along a trajectory of the one or more vessels; (b) analyze second gravity data associated with the gravity map of gravity and gravity gradient, along the trajectory of the one or more vessels, wherein the gravity map is a pre-defined gravity map related to the second gravity data generated using a data processing model; (c) analyze the trajectory of the one or more vessels based on the gravity data associated with the gravity map of the gravity and gravity gradient; (d) process the first gravity data and the second gravity data associated with the gravity map of the gravity and gravity gradient, with at least one of: the first data associated with the velocity of the one or more vessels and the second data associated with the attitude of the one or more vessels; and (e) identify at least one of: position, velocity and attitude, of the one or more vessels to navigate the one or more vessels based on the first gravity data being compared with the second gravity data associated with the gravity map of the gravity and gravity gradient.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
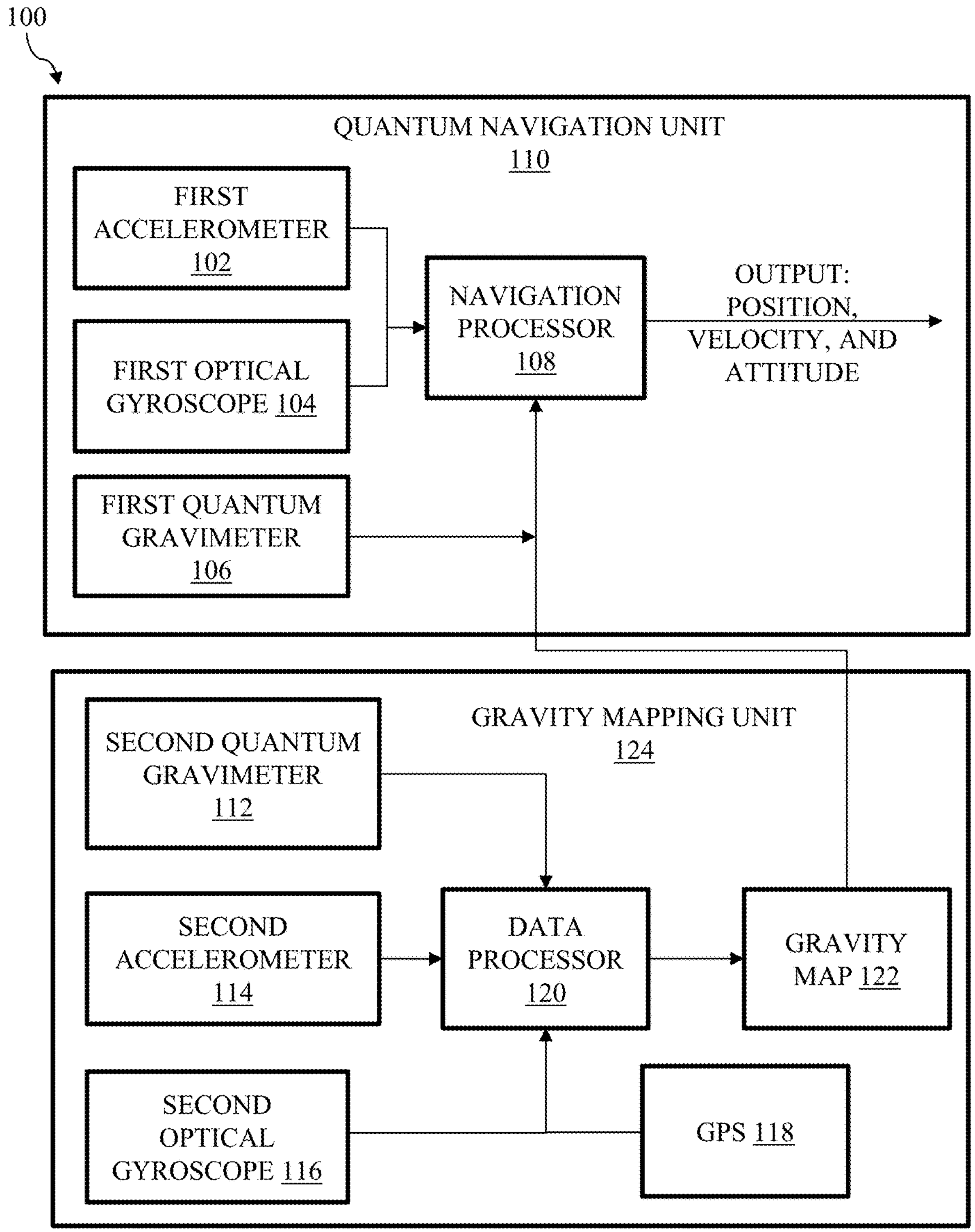
FIG. 1 is a block diagram illustrating a computing environment with a computer-implemented system for determining a precise gravity map to navigate one or more vessels using one or more quantum sensors, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 is a block diagram illustrating a computing environment with a computer-implemented system 100 for determining a precise gravity map to navigate one or more vessels using one or more quantum sensors, in accordance with an embodiment of the present disclosure. According to FIG. 1, the computer-implemented system 100 precisely includes a quantum navigation unit 110 comprising a first accelerometer 102, a first optical gyroscope 104, a first quantum gravimeter 106, and a navigation processor 108 (otherwise called as a quantum navigation processor). The computer-implemented system 100 further includes a gravity mapping unit 124 comprising a second quantum gravimeter 112, a second accelerometer 114, a second optical gyroscope 116, a global positioning system (GPS) 118, and a gravity map 122 (otherwise called as pre-defined gravity map 122).

The gravity mapping unit 124 of the computer-implemented system 100 further includes a data processor 120 (otherwise called as a data processing model) that is initially configured to determine second gravity data to create the gravity map 122 of gravity and gravity gradient, along a trajectory of the one or more vessels. For determining the second gravity data associated with the gravity map 122 of the gravity and gravity gradient, the data processor 120 is configured with the second quantum gravimeter 112 that is configured to analyze a group of atoms in different quantum states to determine third data associated with gravity on the one or more vessels. The data processor 120 is further configured to extract a gravitational acceleration from a total acceleration. In an embodiment, for determining the third data associated with the gravity along the trajectory of the one or more vessels, the second quantum gravimeter 112 is configured to measure total acceleration by combining random acceleration as a result of random vertical movement of the one or more vessels and an acceleration as a result of the gravity.

The data processor 120 is configured with at least one of: the second accelerometer 114 (i.e., a classical accelerometer), a second optical gyroscope 116 and a global positioning system (GPS) 118, that is configured to determine data (i.e., fourth data) associated with at least one of: acceleration, attitude, and co-ordinates, of the one or more vessels. The data processor 120 is further configured to collect at least one of: the third data associated with the gravity on the one or more vessels from the second quantum gravimeter 112, and the fourth data associated with at least one of: the acceleration, attitude, and co-ordinates, of the one or more vessels, from at least one of: the second accelerometer 114, the second optical gyroscope 116, and the GPS 118, to create a precise gravity and gravity gradient map.

The data processor 120 is further configured to determine at least one of: gravity value and spatial gravity anomaly based on at least one of: the third data associated with the gravity on the one or more vessels collected from the second quantum gravimeter 112, and the fourth data associated with at least one of: the acceleration, attitude, and co-ordinates, of the one or more vessels, collected from at least one of: the second accelerometer 114, the second optical gyroscope 116, and the GPS 118. The data processor 120 is further configured to determine the gravity gradient along the trajectory of the one or more vessels based on the gravity and the spatial gravity anomaly. The data processor 120 is further configured to map the gravity and the gravity gradient. The data processor 120 is further configured to determine the second gravity data to create the gravity map 122 of the gravity and the gravity gradient, along the trajectory of the one or more vessels.

Further, the first accelerometer 102 in the one or more vessels is configured to determine data (i.e., first data) associated with velocity of the one or more vessels. The first optical gyroscope 104 in the one or more vessels is configured to determine data (i.e., second data) associated with attitude of the one or more vessels. In an embodiment, at least one of: the first data associated with velocity, the second data associated with the attitude, of the one or more vessels are determined based on initial configurations of the one or more vessels. In an embodiment, the initial configurations of the one or more vessels may include data associated with at least one of: initial velocity values and initial attitude values, of the one or more vessels.

The quantum navigation processor 108 is initially configured to obtain first gravity data from the first quantum gravimeter 106 (e.g., on-board quantum gravimeter) along the trajectory of the one or more vessels. The quantum navigation processor 108 is further configured to analyze the second gravity data associated with the gravity map 122 of the gravity and gravity gradient, along the trajectory of the one or more vessels. In an embodiment, the gravity map 122 is a pre-defined gravity map related to the second gravity data generated using the data processor 120. The quantum navigation processor 108 is further configured to analyze the trajectory of the one or more vessels based on the first gravity data and the second gravity data associated with the gravity map 122 of the gravity and gravity gradient. The quantum navigation processor 108 is further configured to process the first gravity data and the second gravity data associated with the gravity map 122 of the gravity and gravity gradient, with at least one of: the first data associated with the velocity of the one or more vessels and the second data associated with the attitude of the one or more vessels.

The quantum navigation processor 108 is further configured to identify at least one of: the position, velocity (i.e., speed) and attitude, of the one or more vessels to navigate the one or more vessels based on the first gravity data being compared with the second gravity data associated with the gravity map 122 of the gravity and gravity gradient. In an embodiment, the first gravity data are compared with the second gravity data associated with the gravity map 122 of the gravity and gravity gradient, to correct one or more coordinates of the one or more vessels.

In an embodiment of the present disclosure, the computer-implemented system 100 is configured to perform below computations to identify at least one of: the position, the velocity and the attitude, of the one or more vessels to navigate the one or more vessels based on the gravity data associated with the gravity map 122 of the gravity and gravity gradient.

The present disclosure introduces an expedited data acquisition method avoiding noisy perturbations using the second quantum gravimeter 112, ensuring precise gravity mapping 122 across the sea surface. The acceleration, along the direction of the gravity, may be expressed as:

$$\ddot{z}(t)=g_z(t)+\eta(t) \qquad \text{Eqn (1)}$$

Wherein $\ddot{z}(t)$ is the total acceleration measured by the second quantum gravimeter 112, $\eta(t)$ signifies the random acceleration due to random vertical movement of the one or more vessels. In an atom-interferometry-based interferometric measurement, the random acceleration directly affects the number of atomic populations in a particular quantum state which is used to extract the gravitational acceleration. Further, $g_z(t)$ represents the acceleration due to gravity. The time dependence on gravity comes through the movement of the one or more vessels. The tilting of the local reference frame of the one or more vessels may also contribute to noise which may be removed from the gyroscopic data.

In an atom-based gravimeter, acceleration is quantified by analyzing the distribution of atoms within specific quantum states. Within the framework of the two-level approximation in interferometric models designed for acceleration measurement, the population of atoms residing in the ground state may be expressed as:

$$P(t)=\frac{1}{2}+\frac{C}{2}\cos\{2(k\ddot{z}(t)-\pi\alpha')T^2\} \qquad \text{Eqn (2)}$$

Wherein, C symbolizes the contrast of the observation, k denotes the momentum of an atom. The parameter α' is referred to as the chirp rate of the light beam utilized in atom interferometry to address the Doppler shift of light within the atomic frame of reference. Additionally, T represents the interferometric time. Inserting Eqn. (1) into Eqn. (2) the following may be written:

$$\cos^{-1}\left(\frac{2P(t)-1}{C}\right)=2k\cdot(g_z(t)-\alpha)T^2+2k\cdot\eta(t)T^2 \qquad \text{Eqn (3)}$$

$$\cos^{-1}\left(\frac{2P(t)-1}{C}\right)=2k(\delta g)T^2+\eta_p(t)$$

Where, $\alpha=\alpha'\pi/k$, $\delta g=g_z(t)-\alpha$ and $\eta_p(t)=2k\cdot\eta(t)T^2$. By integrating the equation and considering that the acceleration due to gravity remains practically constant over a period of t', the following expression may be derived as follow:

$$\frac{1}{t'}\int_0^{t'}\cos^{-1}\left(\frac{2P(t)-1}{C}\right)=\frac{1}{t'}\left\{2k\int_0^{t'}(\delta g)T^2dt+\int_0^{t'}\eta_p(t)dt\right\} \qquad \text{Eqn (4)}$$

$$\frac{1}{t'}\int_0^{t'}\cos^{-1}\left(\frac{2P(t)-1}{C}\right)=2k(\delta g)T^2+\eta_r(t')$$

In the expression, $$\eta_r(t')=\frac{1}{t'}\int_0^{t'}\eta_p(t)dt$$

and $\delta g=g_2(t)-\alpha$, which provides with the measurement of δg with an uncertainty budget of $\eta_p(t)$. The uncertainty may trivially be reduced by increasing t'. However, this will either affect the survey speed or an error may be introduced in the result through the time dependence of gravitational acceleration. Upon time-integration, the atomic population is provided by:

$$P_r(t')=\frac{1}{2}+\frac{c}{2}\cos\{2k\cdot(g_z(t')-\alpha)T^2+\eta_r(t')\} \qquad \text{Eqn (5)}$$

For a sufficiently long survey with a typical velocity and low constant acceleration of the one or more vessels, it is adequate to model the variation in gravitational acceleration as follows:

$$g_z(t')=g_z(t'=0)+\left.\frac{dg_z}{dt'}\right|_{t'=0}\cdot t'+\frac{1}{2}\left.\frac{d^2g_z}{dt'^2}\right|_{t'=0}\cdot t'^2= \qquad \text{Eqn (6)}$$

$$g_z(t'=0)+(\nabla g_z\cdot v)t'+\frac{1}{2}(\nabla^2 g_z\cdot v^2+\nabla g_z\cdot f)t'^2$$

Where, v and f represent the velocity and acceleration of the vessel at t'=0.

The action of the differential operator $$\nabla=\sum_i \hat{x}_i\frac{\partial}{\partial x_i}$$

is effectively confined to the horizontal plane (i=1,2), given that the vertical components (i=3) of v and fare practically negligible over a timescale of t'. If the time dependence of the chirp rate is given by $$\alpha(t') = \alpha_0 + \beta t' + \frac{Y}{2}t'^2,$$

combining Eqn. (5) and Eqn. (6) yields the following expression:

$$P_r(t') = \frac{1}{2} + \frac{C}{2}\cos\{A + Bt' + Dt'^2 + \eta_r(t')\} \quad \text{Eqn (7)}$$

Where $A=2k\cdot(g_z(t'=0)-\alpha_0)T^2$, $B=2k\cdot(\nabla g_z\cdot v-\beta)T^2$ and $D=k\cdot(\nabla^2 g_z\cdot v^2+\nabla g_z\cdot f-\gamma)T^2$. This suggests that the atomic population may oscillate with a circular frequency of $$\omega = \frac{B}{2\pi}$$

and with an initial phase of A. Further, D contributes to the linear sweep of the frequency. The initial phase, frequency, and frequency sweep may be adjusted by manipulating $\alpha_0$, ↑ and γ. If B and D are sufficiently slower, the contribution from $\eta_r$(t') may be filtered out as it induces a faster phase modulation of the oscillation. After noise removal, $g_z$, $$\nabla g_z^2$$

may be deduced by fitting a sinusoidal curve into the data of $P_r$(t'). Thus, the gravity and gravity gradient database can be built.

The computer-implemented method described for measuring gravitational acceleration incorporates errors arising from the measurement of vessel velocity and acceleration. For instance, the primary error in measuring the gravity gradient along the vessel trajectory is given by:

$$\delta(\nabla_r g_z) = \frac{\delta|v|}{v^2}\left(\frac{B}{2kT^2} + \beta\right) + \frac{1}{|v|}\frac{\delta B}{2kT^2} \quad \text{Eqn (8)}$$

It is important to highlight that as velocity increases, the measurement error tends to decrease. However, it is further important to mention that excessively high velocities may introduce higher-order effects in Eqn. (6), resulting in deviations from the actual scenario.

Upon the availability of the gravity data, the reverse technique may be applied to deduce the one or more trajectories of the one or more vessels. Tracking $P_r$(t') for consecutive intervals, each of duration $T_0$, allows for position updates after each interval. The error in position estimation after each interval is given by:

$$\delta r(T_0) = \int_0^{T_0} dt' \int_0^{t'} dt(f_a(t) - f) \quad \text{Eqn (9)}$$

Where, $f_a$(t) represents the actual acceleration during the journey. Since $f_a$(0)=f, Eqn. (9) indicates 'zero error' if the one or more vessels maintain constant acceleration. Even random fluctuations or small oscillations in acceleration around a constant value yield negligible error in estimation. Specifically, if the average acceleration closely matches the initial value, the error remains insignificant. This computer-implemented method is suitable for a coarse navigation system that neither relies on inertial sensors nor satellite-based positioning systems.

Figure 2:
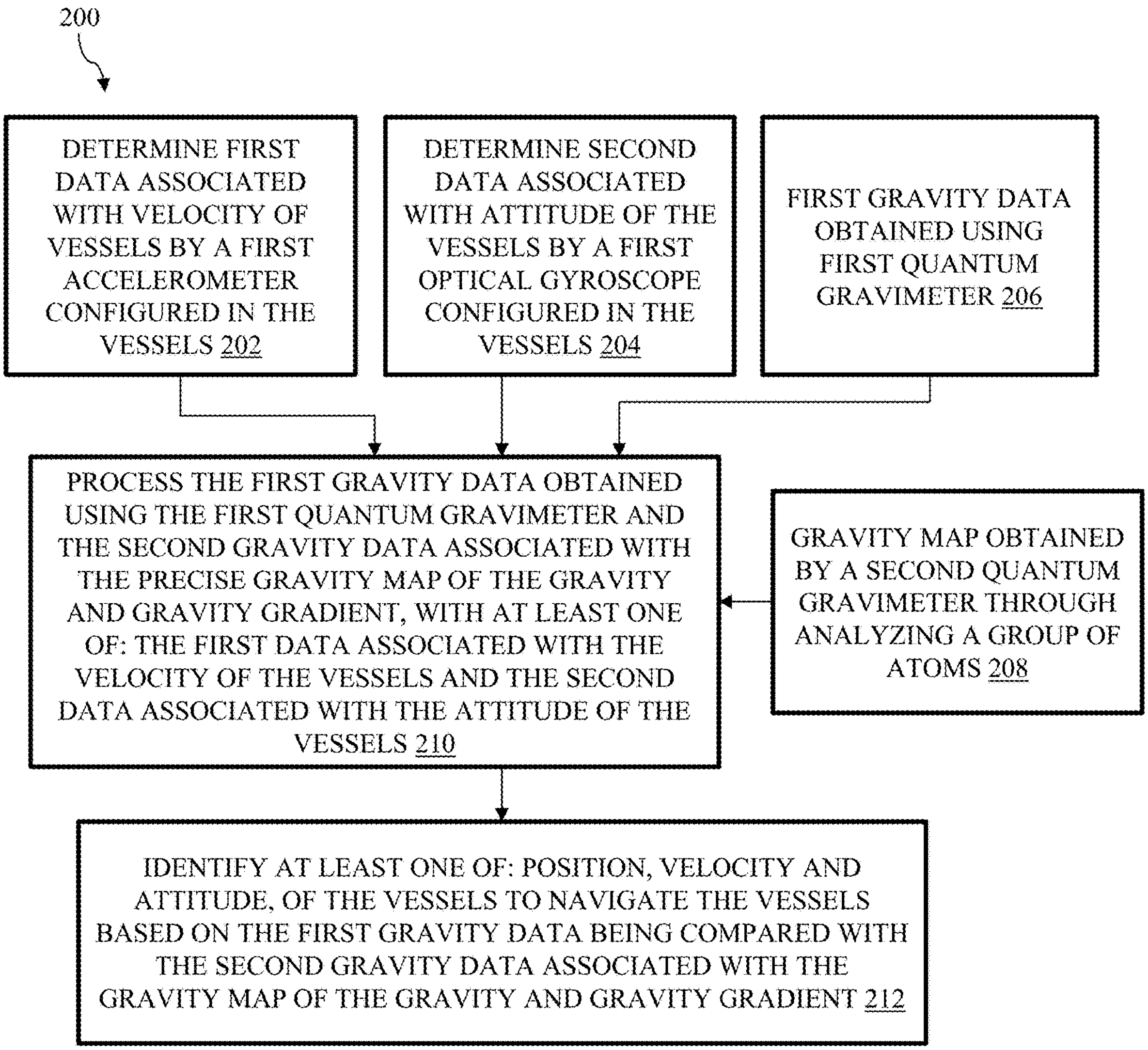
FIG. 2 is a process flow depicting identification of at least one of: position, velocity and attitude, of the one or more vessels to navigate the one or more vessels, in accordance with another embodiment of the present disclosure.

FIG. 2 is a process flow 200 depicting identification of at least one of: the position, velocity and attitude, of the one or more vessels to navigate the one or more vessels, in accordance with another embodiment of the present disclosure.

At step 202, the first data associated with the velocity of the one or more vessels, are determined using the first accelerometer 102 configured in the one or more vessels.

At step 204, the second data associated with the attitude of the one or more vessels, are determined using the first optical gyroscope 104 configured in the one or more vessels.

At step 206, the first gravity data is obtained from the first quantum gravimeter 106, along the trajectory of the one or more vessels.

At step 208, the second gravity data associated with the gravity map 122 of gravity and gravity gradient, along the trajectory of the one or more vessels, is analyzed. The second gravity data associated with the gravity map 122 is obtained by the second quantum gravimeter 106 through analyzing a group of atoms. In an embodiment, the second gravity data associated with the gravity map 122 is generated using the data processor 120.

At step 210, the first gravity data obtained from first quantum gravimeter 106 and the second gravity data associated with the gravity map 122 of the gravity and gravity gradient, are processed with at least one of: the first data associated with the velocity of the one or more vessels and the second data associated with the attitude of the one or more vessels.

At step 212, at least one of: position, velocity and attitude, of the one or more vessels are identified to navigate the one or more vessels based on the first gravity data being compared with the second gravity data associated with the gravity map 122 of the gravity and gravity gradient.

Figure 3:
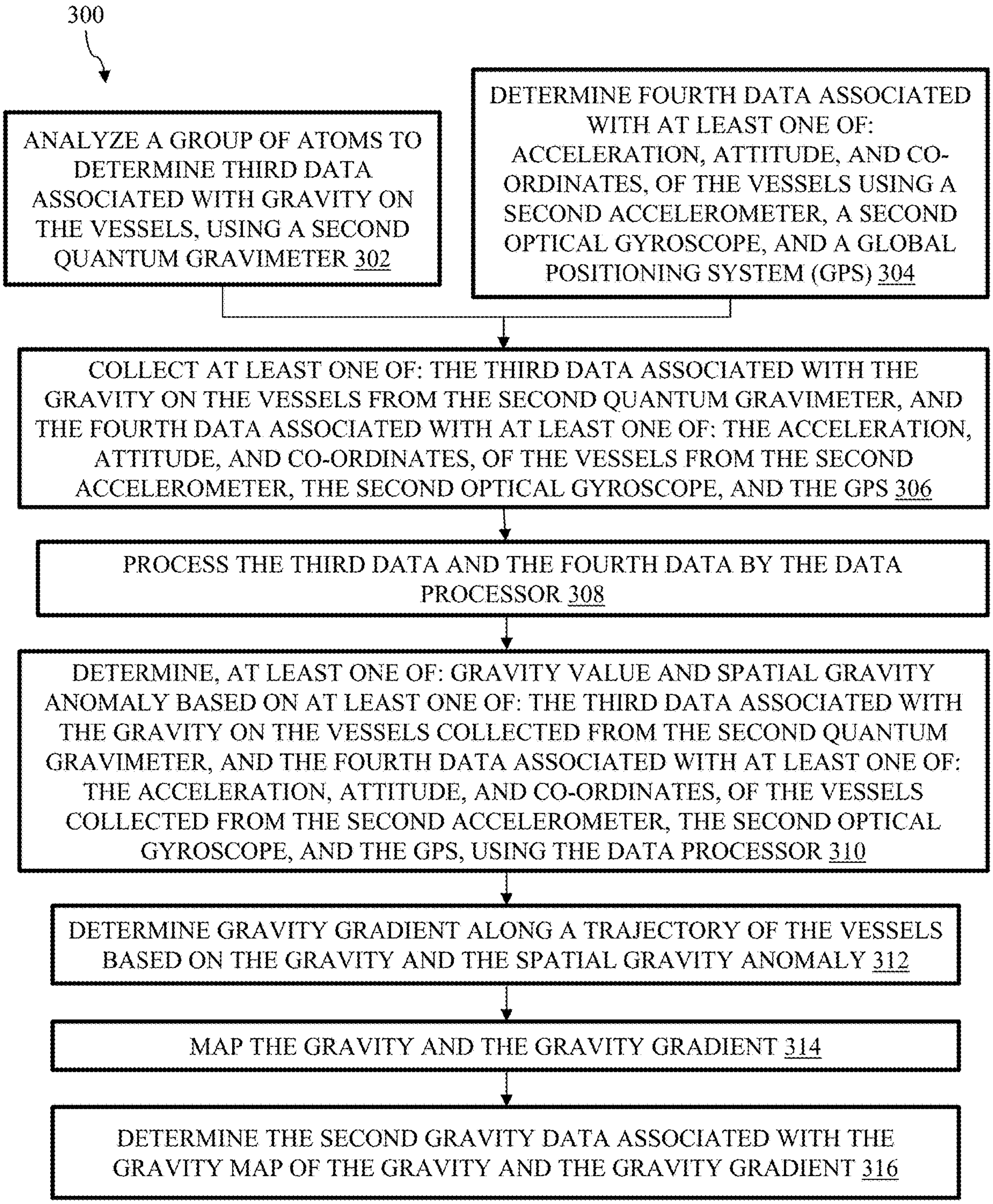
FIG. 3 is a process flow depicting determination of second gravity data associated with gravity map of gravity and gravity gradient, using a data processing model, in accordance with another embodiment of the present disclosure.

FIG. 3 is a process flow 300 depicting determination of the second gravity data associated with the precise gravity map 122 of the gravity and gravity gradient using the data processor 120 (i.e., the data processing model), in accordance with another embodiment of the present disclosure.

At step 302, the group of atoms are analyzed to determine the third data associated with the gravity on the one or more vessels, using the second quantum gravimeter 112.

At step 304, the fourth data associated with at least one of: the acceleration, attitude, and co-ordinates, of the one or more vessels, are determined using at least one of: the second accelerometer 114 (e.g., the classical accelerometer), the second optical gyroscope 116, and the GPS 118.

At step 306, at least one of: the third data associated with the gravity on the one or more vessels from the second quantum gravimeter 112, and the fourth data associated with at least one of: the acceleration, attitude, and co-ordinates, of the one or more vessels, are collected by the data processor 120 from at least one of: the second accelerometer 114, the second optical gyroscope 116, and the GPS 118.

At step 308, at least one of: the third data associated with the gravity on the one or more vessels from the second quantum gravimeter 112, and the fourth data associated with at least one of: the acceleration, attitude, and co-ordinates, of the one or more vessels, are processed by the data processor 120.

At step 310, at least one of: the gravity value and spatial gravity anomaly, is determined based on at least one of: the third data associated with the gravity on the one or more vessels collected from the second quantum gravimeter 112, and the fourth data associated with at least one of: the acceleration, attitude and co-ordinates, of the one or more vessels, collected from at least one of: the second accelerometer 114, the second optical gyroscope 116, and the GPS 118.

At step 312, the gravity gradient is determined along the trajectory of the one or more vessels using the data processor 120 based on the gravity and the spatial gravity anomaly.

At step 314, the gravity and the gravity gradient are mapped using the data processor 120.

At step 316, the second gravity data are determined to create the gravity map 122 of the gravity and the gravity gradient, along the trajectory of the one or more vessels, using the data processor 120.

Figure 4:
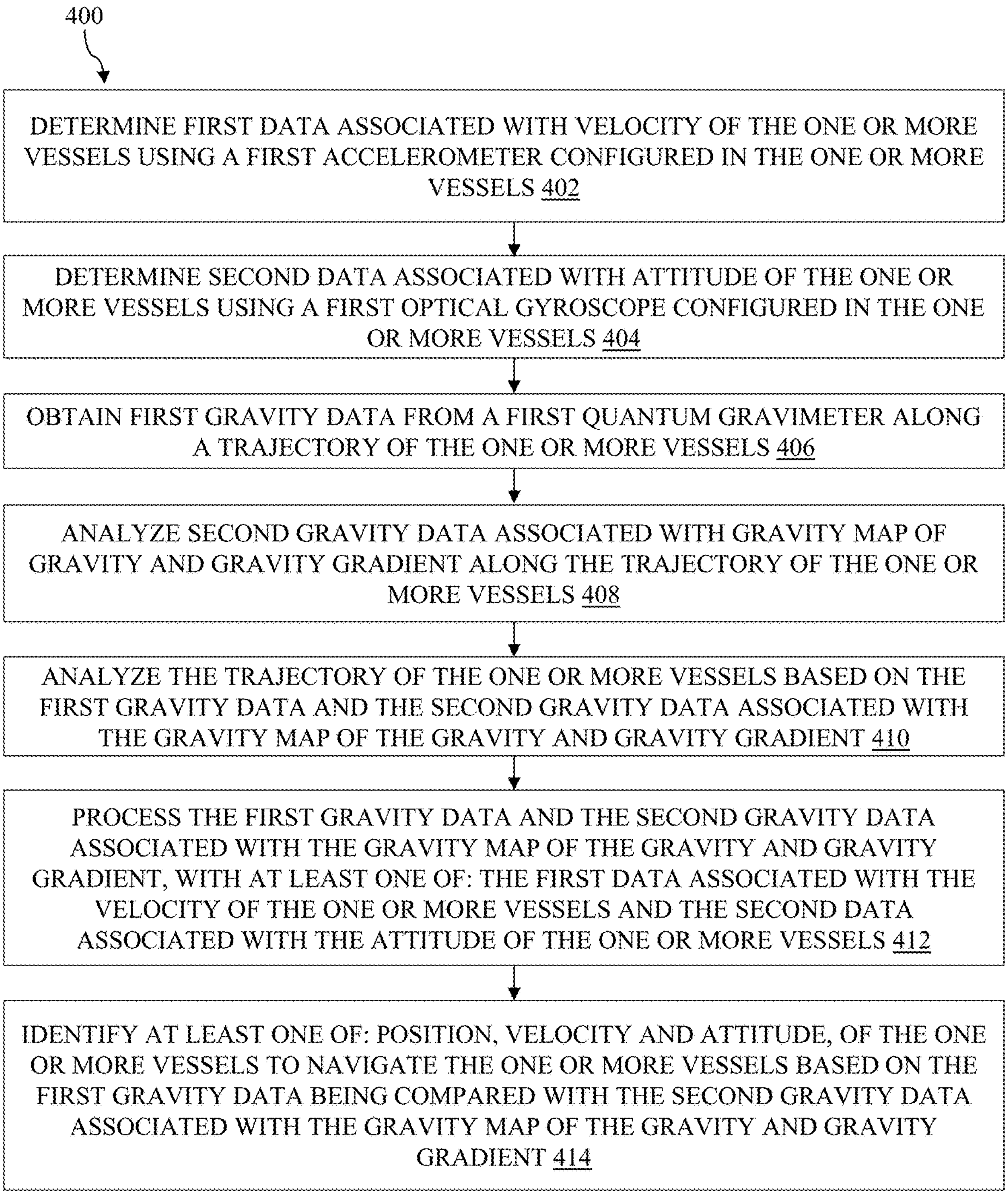
FIG. 4 is a flow chart illustrating a computer-implemented method for determining the precise gravity map to navigate the one or more vessels using the one or more quantum sensors, in accordance with an embodiment of the present disclosure.

FIG. 4 is a flow chart illustrating an computer-implemented method 400 for determining the gravity map 122 to navigate the one or more vessels using the one or more quantum sensors, in accordance with an embodiment of the present disclosure.

At step 402, the first data associated with the velocity of the one or more vessels, are determined using the first accelerometer 102 configured in the one or more vessels.

At step 404, the second data associated with the attitude of the one or more vessels, are determined using the first optical gyroscope 104 configured in the one or more vessels.

At step 406, the first gravity data are obtained from the first quantum gravimeter 106 along the trajectory of the one or more vessels.

At step 408, the second gravity data associated with the gravity map 122 of gravity and gravity gradient, are analyzed along the trajectory of the one or more vessels. In an embodiment, the gravity map 122 is the pre-defined gravity map related to the second gravity data generated using the data processor 120 (i.e., the data processing model)

At step 410, the trajectory of the one or more vessels are analyzed based on the first gravity data and the second gravity data associated with the gravity map 122 of the gravity and gravity gradient.

At step 412, the first gravity data and the second gravity data associated with the gravity map 122 of the gravity and gravity gradient, are processed with at least one of: the first data associated with the velocity of the one or more vessels and the second data associated with the attitude of the one or more vessels.

At step 414, at least one of: position, velocity and attitude, of the one or more vessels are identified to navigate the one or more vessels based on the first gravity data being compared with the second gravity data associated with the gravity map 122 of the gravity and gravity gradient. In an embodiment, the first gravity data are compared with the second gravity data associated with the gravity map 122 of the gravity and gravity gradient, to correct the one or more coordinates of the one or more vessels.

The present invention has following advantages. The primary purpose of the present invention with the computer-implemented system 100 is to enhanced Marine Mapping with Quantum Gravimetry and configured to navigate the one or more vessels using the one or more quantum sensors. The present invention is configured to utilize strapdown gravimetry system which has the combination of an Inertial Measuring Unit (IMU) and a Global Navigation Satellite System (GNSS) to measure the Earth's gravity field. The present invention of the computer-implemented system 100 is further configured to reduce dependency on terrestrial and space-based navigation systems. The present invention of computer-implemented system 100 is further configured to utilize the gravity map 122 to navigate the one or more vessels in GPS-denied areas.

The present invention of the computer-implemented system 100 is further configured to obviate need for the one or more vessels to expose masts for obtaining position updates. The present invention is further configured to achieve extended data acquisition by prolonging data acquisition times, enhancing data resolution and accuracy, compensating for the disruptive influence of ocean currents on gravitational accelerations. The mapping utilizes an algorithm to provide faster marine gravity mapping 122 aboard moving vessels, which is a significant advancement. In an embodiment, the efficacy, accuracy, and computational efficiency, of the algorithm may vary under different marine conditions and vessel speeds necessitate thorough validation.

The platform performs simultaneous mapping 122 of the gravity and gravity gradient, which holds potential for deeper insights into subsurface geological structures and density variations. The validation efforts should focus on demonstrating the algorithm's ability to accurately discern geological features based on their gravity and gradient characteristics. The improved high-precision gravity mapping 122 has the potential to replace traditional inertial navigation systems (INS) based on GPS calibration in maritime operations. Evaluating the algorithm's navigational accuracy, reliability, and robustness with regard to the improved navigation system across various environmental conditions is crucial.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the computer-implemented system 100 either directly or through intervening I/O controllers. Network adapters may also be coupled to the computer-implemented system 100 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 100 in accordance with the embodiments herein. The computer-implemented system 100 herein comprises at least one processor or central processing unit (CPU). The CPUs are interconnected via the system bus to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the computer-implemented system 100. The computer-implemented system 100 can read the inventive instructions on the program storage devices and follow these instructions to execute the methodology of the embodiments herein.

The computer-implemented system 100 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A computer-implemented method for determining a gravity map to navigate one or more vessels based on one or more quantum sensors, the computer-implemented method comprising:

determining first data associated with velocity of the one or more vessels using a first accelerometer configured in the one or more vessels;

determining second data associated with attitude of the one or more vessels using a first optical gyroscope configured in the one or more vessels;

obtaining first gravity data from a first quantum gravimeter along a trajectory of the one or more vessels;

analyzing second gravity data associated with the gravity map of gravity and gravity gradient, along the trajectory of the one or more vessels, wherein the gravity map is a pre-defined gravity map related to the second gravity data generated using a data processing model;

analyzing the trajectory of the one or more vessels based on the first gravity data and the second gravity data associated with the gravity map of the gravity and gravity gradient;

processing the first gravity data and the second gravity data associated with the gravity map of the gravity and gravity gradient, with at least one of: the first data associated with the velocity of the one or more vessels and the second data associated with the attitude of the one or more vessels, using a navigation processor; and identifying at least one of: position, velocity and attitude, of the one or more vessels to navigate the one or more vessels based on the first gravity data being compared with the second gravity data associated with the gravity map of the gravity and gravity gradient.

2. The computer-implemented method of claim 1, further comprising determining, by the data processing model, the second gravity data to create the gravity map of the gravity and gravity gradient, along the trajectory of the one or more vessels, comprises:

analyzing, by a second quantum gravimeter, a group of atoms to determine third data associated with gravity on the one or more vessels;

determining, by at least one of: a second accelerometer, a second optical gyroscope, and a global positioning system (GPS), fourth data associated with at least one of: acceleration, attitude, and co-ordinates, of the one or more vessels;

collecting, by the data processing model, at least one of: the third data associated with the gravity on the one or more vessels from the second quantum gravimeter, and the fourth data associated with at least one of: the acceleration, attitude, and co-ordinates, of the one or more vessels, from at least one of: the second accelerometer, the second optical gyroscope, and the GPS;

determining, by the data processing model, at least one of: a gravity value and a spatial gravity anomaly based on at least one of: the third data associated with the gravity on the one or more vessels collected from the second quantum gravimeter, and the fourth data associated with at least one of: the acceleration, attitude, and co-ordinates, of the one or more vessels, collected from at least one of: the second accelerometer, the second optical gyroscope, and the GPS;

determining, by the data processing model, the gravity gradient along the trajectory of the one or more vessels based on the gravity value and the spatial gravity anomaly;

mapping, by the data processing model, the gravity and the gravity gradient; and determining, by the data processing model, the second gravity data to create the gravity map of the gravity and the gravity gradient, along the trajectory of the one or more vessels.

3. The computer-implemented method of claim 2, further comprising extracting, by the data processing model, a gravitational acceleration from a total acceleration.

4. The computer-implemented method of claim 2, wherein determining the third data associated with the gravity along the trajectory of the one or more vessels, comprises measuring the total acceleration using the second quantum gravimeter, and wherein measuring the total acceleration comprises combining random acceleration as a result of random vertical movement of the one or more vessels and an acceleration as a result of the gravity.

5. The computer-implemented method of claim 1, wherein at least one of: the first data associated with velocity, the second data associated with the attitude, of the one or more vessels are determined based on initial configurations of the one or more vessels, and wherein the initial configurations of the one or more vessels comprise data associated with at least one of: initial velocity values and initial attitude values, of the one or more vessels.

6. The computer-implemented method of claim 1, wherein time dependence on the gravity arises as a result of a motion of the one or more vessels.

7. A computer-implemented system for determining a gravity map to navigate one or more vessels based on one or more quantum sensors, the computer-implemented system comprising:

a first accelerometer in the one or more vessels configured to determine first data associated with velocity of the one or more vessels;

a first optical gyroscope in the one or more vessels configured to determine second data associated with attitude of the one or more vessels;

a navigation processor configured to:

obtain first gravity data from a first quantum gravimeter along a trajectory of the one or more vessels;

analyze second gravity data associated with the gravity map of gravity and gravity gradient, along the trajectory of the one or more vessels, wherein the gravity map is a pre-defined gravity map related to the second gravity data generated using a data processing model;

analyze the trajectory of the one or more vessels based on the first gravity data and the second gravity data associated with the gravity map of the gravity and gravity gradient;

process the first gravity data and the second gravity data associated with the gravity map of the gravity and gravity gradient, with at least one of: the first data associated with the velocity of the one or more vessels and the second data associated with the attitude of the one or more vessels; and identify at least one of: position, velocity and attitude, of the one or more vessels to navigate the one or more vessels based on the first gravity data being compared with the second gravity data associated with the gravity map of the gravity and gravity gradient.

8. The computer-implemented system of claim 7, further comprising:

the data processing model configured to determine the second gravity data to create the gravity map of the gravity and gravity gradient, along the trajectory of the one or more vessels, wherein in determining the second gravity data associated with the gravity map of the gravity and gravity gradient, the data processing model is configured with:

a second quantum gravimeter configured to analyze a group of atoms to determine third data associated with gravity on the one or more vessels;

at least one of: a second accelerometer, a second optical gyroscope, and a global positioning system (GPS), configured to determine fourth data associated with at least one of: acceleration, attitude and co-ordinates, of the one or more vessels;

the data processing model further configured to:

collect at least one of: the third data associated with the gravity on the one or more vessels from the second quantum gravimeter, and the fourth data associated with at least one of: the acceleration, attitude, and co-ordinates, of the one or more vessels, from at least one of: the second accelerometer, the second optical gyroscope, and the GPS;

determine at least one of: a gravity value and a spatial gravity anomaly based on at least one of: the third data associated with the gravity on the one or more vessels collected from the second quantum gravimeter, and the fourth data associated with at least one of: the acceleration, attitude, and co-ordinates, of the one or more vessels, collected from at least one of: the second accelerometer, the second optical gyroscope, and the GPS;

determine the gravity gradient along the trajectory of the one or more vessels based on the gravity value and the spatial gravity anomaly;

map the gravity and the gravity gradient; and determine the second gravity data to create the gravity map of the gravity and the gravity gradient, along the trajectory of the one or more vessels.

9. The computer-implemented system of claim 8, wherein the data processing model is configured to extract a gravitational acceleration from a total acceleration.

10. The computer-implemented system of claim 8, wherein in determining the third data associated with the gravity along the trajectory of the one or more vessels, the second quantum gravimeter is configured to measure the total acceleration, and wherein the total acceleration is measured by combining random acceleration as a result of random vertical movement of the one or more vessels and an acceleration as a result of the gravity.

11. The computer-implemented system of claim 7, wherein at least one of: the first data associated with velocity, the second data associated with the attitude, of the one or more vessels are determined based on initial configurations of the one or more vessels, and wherein the initial configurations of the one or more vessels comprise data associated with at least one of: initial velocity values and initial attitude values, of the one or more vessels.

12. The computer-implemented system of claim 7, wherein time dependence on the gravity arises as a result of a motion of the one or more vessels.

13. A non-transitory computer-readable storage medium having instructions stored therein that when executed by one or more hardware processors, cause the one or more hardware processors to execute operations of:

determining first data associated with velocity of the one or more vessels using a first accelerometer configured in the one or more vessels;

determining second data associated with attitude of the one or more vessels using a first optical gyroscope configured in the one or more vessels;

obtaining first gravity data from a first quantum gravimeter along a trajectory of the one or more vessels;

analyzing second gravity data associated with a gravity map of gravity and gravity gradient, along a trajectory of the one or more vessels, wherein the gravity map is a pre-defined gravity map related to the second gravity data generated using a data processing model;

analyzing the trajectory of the one or more vessels based on the first gravity data and the second gravity data associated with the gravity map of the gravity and gravity gradient;

processing the first gravity data and the second gravity data associated with the gravity map of the gravity and gravity gradient, with at least one of: the first data associated with the velocity of the one or more vessels and the second data associated with the attitude of the one or more vessels, using a navigation processor; and identifying at least one of: position, velocity and attitude, of the one or more vessels to navigate the one or more vessels based on the first gravity data being compared with the second gravity data associated with the gravity map of the gravity and gravity gradient.

14. The non-transitory computer-readable storage medium of claim 13, further comprising determining, by the data processing model, the second gravity data to create the gravity map of the gravity and gravity gradient, along the trajectory of the one or more vessels, comprises:

analyzing, by a second quantum gravimeter, a group of atoms to determine third data associated with gravity on the one or more vessels;

determining, by at least one of: a second accelerometer, a second optical gyroscope, and a global positioning system (GPS), fourth data associated with at least one of: acceleration, attitude, and co-ordinates, of the one or more vessels;

collecting, by the data processing model, at least one of: the third data associated with the gravity on the one or more vessels from the second quantum gravimeter, and the fourth data associated with at least one of: the acceleration, attitude, and co-ordinates, of the one or more vessels, from at least one of: the second accelerometer, the second optical gyroscope, and the GPS;

determining, by the data processing model, at least one of: a gravity value and a spatial gravity anomaly based on at least one of: the third data associated with the gravity on the one or more vessels collected from the second quantum gravimeter, and the fourth data associated with at least one of: the acceleration, attitude, and co-ordinates, of the one or more vessels, collected from at least one of: the second accelerometer, the second optical gyroscope, and the GPS;

determining, by the data processing model, the gravity gradient along the trajectory of the one or more vessels-based on the gravity value and the spatial gravity anomaly;

mapping, by the data processing model, the gravity and the gravity gradient; and determining, by the data processing model, the second gravity data to create the gravity map of the gravity and the gravity gradient, along the trajectory of the one or more vessels.

15. The non-transitory computer-readable storage medium of claim 14, further comprising extracting, by the data processing model, a gravitational acceleration from a total acceleration.

16. The non-transitory computer-readable storage medium of claim 14, wherein determining the third data associated with the gravity along the trajectory of the one or more vessels, comprises measuring the total acceleration using the second quantum gravimeter, and wherein measuring the total acceleration total acceleration comprises combining random acceleration as a result of random vertical movement of the one or more vessels and an acceleration as a result of the gravity.

17. The non-transitory computer-readable storage medium of claim 13, wherein at least one of: the first data associated with velocity, the second data associated with the attitude, of the one or more vessels are determined based on initial configurations of the one or more vessels, and wherein the initial configurations of the one or more vessels comprise data associated with at least one of: initial velocity values and initial attitude values, of the one or more vessels.

18. The non-transitory computer-readable storage medium of claim 13, wherein time dependence on the gravity arises as a result of a motion of the one or more vessels.

* * * * *